(12) United States Patent
Lee et al.

(10) Patent No.: US 12,418,187 B2
(45) Date of Patent: Sep. 16, 2025

(54) JIG FOR CHARGING AND DISCHARGING BATTERY CELL

(71) Applicant: LG ENERGY SOLUTION, LTD., Seoul (KR)

(72) Inventors: So Yeon Lee, Daejeon (KR); Hyung In Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 744 days.

(21) Appl. No.: 17/772,454

(22) PCT Filed: Aug. 31, 2021

(86) PCT No.: PCT/KR2021/011700
§ 371 (c)(1),
(2) Date: Apr. 27, 2022

(87) PCT Pub. No.: WO2022/065723
PCT Pub. Date: Mar. 31, 2022

(65) Prior Publication Data
US 2022/0376527 A1 Nov. 24, 2022

(30) Foreign Application Priority Data
Sep. 24, 2020 (KR) .......................... 10-2020-0123575

(51) Int. Cl.
*H02J 7/00* (2006.01)
*H01M 10/44* (2006.01)

(52) U.S. Cl.
CPC ........... *H02J 7/0042* (2013.01); *H01M 10/44* (2013.01)

(58) Field of Classification Search
CPC ............................. H02J 7/0042; H01M 10/44

USPC ......................................................... 320/128
See application file for complete search history.

(56) References Cited

U.S. PATENT DOCUMENTS

2006/0200972 A1* 9/2006 Onishi ................ H01M 50/296
320/107
2020/0153030 A1* 5/2020 Bae ........................ H01M 10/44

FOREIGN PATENT DOCUMENTS

| CN | 202134617 U | 2/2012 |
| CN | 204035861 U | 12/2014 |
| JP | 2017-107667 A | 6/2017 |
| KR | 20-1995-0000539 Y1 | 2/1995 |
| KR | 10-2009-0127754 A | 12/2009 |
| KR | 10-0964887 B1 | 6/2010 |
| KR | 10-2012-0088120 A | 8/2012 |
| KR | 10-2014-0044444 A | 4/2014 |
| KR | 10-2016-0004661 A | 1/2016 |
| KR | 10-2016-0061124 A | 5/2016 |

(Continued)

OTHER PUBLICATIONS

Translation of KR20160072571, 18 pages.*

(Continued)

*Primary Examiner* — Nathaniel R Pelton
(74) *Attorney, Agent, or Firm* — Birch, Stewart, Kolasch & Birch, LLP (57) ABSTRACT

A jig for charging and discharging a battery cell includes a plate where a target battery cell is disposed; and a lead-fixing jig which is located in at least one side of the plate and fixes an electrode lead drawn from a battery case by pressing the electrode lead from both sides. A recessed portion is formed at an area where the lead-fixing jig contacts the electrode lead.

10 Claims, 9 Drawing Sheets

(56) References Cited

FOREIGN PATENT DOCUMENTS

| KR | 10-2016-0067491 A | 6/2016 |
|----|-------------------|--------|
| KR | 10-2016-0072571 A | 6/2016 |
| KR | 20160072571 * | 6/2016 |
| KR | 10-2016-0077880 A | 7/2016 |
| KR | 10-1728102 B1 | 4/2017 |
| KR | 10-2017-0071253 A | 6/2017 |
| KR | 10-2018-0110831 A | 10/2018 |
| KR | 20180110831 * | 10/2018 |
| KR | 10-2019-0072289 A | 6/2019 |
| KR | 10-2020-0050733 A | 5/2020 |
| KR | 10-2020-0053783 A | 5/2020 |

OTHER PUBLICATIONS

Translation of KR20180110831, 14 pages.*
Extended European Search Report for European Application No. 21872753.5, dated Mar. 22, 2023.
International Search Report for PCT/KR2021/011700 (PCT/ISA/210) mailed on Dec. 7, 2021.
Chinese Office Action and Search Report for Chinese Application No. 202180006133.8, dated Jul. 1, 2025, with English translation.

* cited by examiner

[FIG. 1]

CONVENTIONAL ART

JIG FOR CHARGING AND DISCHARGING BATTERY CELL

TECHNICAL FIELD

This application claims the benefit of priority based on Korean Patent Application No. 10-2020-0123575, filed on Sep. 24, 2020, and the entire contents of the Korean patent application are incorporated herein by reference.

The present invention relates to a jig for charging and discharging a battery cell.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

A secondary battery is manufactured through a process of assembling a battery cell and activating the battery cell, and in the process of activating the battery cell, charging is performed at a condition which is necessary for activation by mounting the battery cell at a predetermined jig. Such a charge and discharge process performs the function of imparting predetermined characteristics which a secondary battery should have in order to allow a battery cell, which has been assembly-completed for the first time during the process of manufacturing a secondary battery, to store electric energy.

Further, when a battery cell is manufactured, such charge/discharge equipment is essential to evaluate the performance of the battery cell or whether there is a defect in the battery cell.

Figure 1:
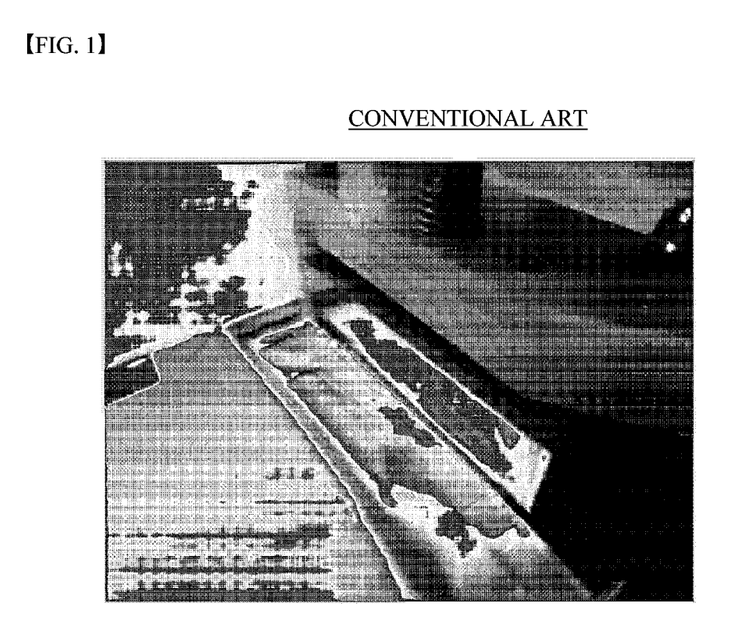
FIG. 1 is a photograph showing a shape of a conventional jig for charging and discharging a battery cell.

FIG. 1 is a photograph showing a shape of a conventional jig for charging and discharging a battery cell.

Referring to FIG. 1, a battery cell has a structure where an electrode lead has been drawn to the outside of a battery case, and a jig is positioned at the upper portion and the lower portion of the electrode lead in order to fix the electrode lead on the upper surface and the lower surface. At this time, the upper jig descends by a screw to thereby press and fix the electrode lead supported by the lower jig.

At this time, if the battery cell is not fixed at the accurate position during the process where the electrode lead is fastened to the jig, even the insulating film attached on the electrode lead may be fastened to the jig as shown in FIG. 1, which may cause interference during charge/discharge.

Further, when a battery cell is fastened to a jig, if it is difficult to check the inside of the jig depending on the environment around the jig, it is difficult to accurately fasten the electrode lead at a desired position.

Therefore, there is a need for a jig for charging and discharging a battery cell for solve the above problems.

DISCLOSURE

Technical Problem

The present invention is believed to solve at least some of the above problems. For example, an aspect of the present invention provides a jig for charging and discharging a battery cell capable of fastening an electrode lead always at the same position.

Technical Solution

A jig for charging and discharging a battery cell according to the present invention includes a plate configured to support a battery cell; and a lead-fixing jig located at at least one side of the plate, the lead-fixing jig configured to contact and fix an electrode lead drawn from a battery case of the battery cell by pressing the electrode lead from upper and lower sides of the electrode lead, wherein at least one recessed portion is formed at an area where the lead-fixing jig contacts the electrode lead.

In a specific example, the lead-fixing jig includes a lower jig to support the electrode lead from the lower side of the electrode lead; and an upper jig to press the electrode lead from the upper side of the electrode lead.

In one example, the at least one recessed portion may be formed on an upper surface of the lower jig.

At this time, a depth of the at least one recessed portion is equal to a thickness of the electrode lead or is smaller than the thickness of the electrode lead.

In another example, the at least one recessed portion includes a first recessed portion on a lower surface of the upper jig and a second recessed portion on an upper surface of the lower jig.

At this time, a sum of thicknesses of the first and second recessed portions is equal to a thickness of the electrode lead or is smaller than the thickness of the electrode lead.

In a specific example, a shape of a horizontal section of the at least one recessed portion may correspond to a shape of the electrode lead.

Herein, the horizontal section of the at least one recessed portion may have a quadrangle shape.

In a specific example, a width of the at least one recessed portion may be greater than a width of the electrode lead.

Further, the at least one recessed portion may include an inner wall perpendicular to the plate, and the lead-fixing jig may be positioned on the plate to cause an end of the electrode lead to contact the inner wall of the at least one recessed portion.

Further, the lead-fixing jig may be positioned on the plate at a position spaced apart by a predetermined distance from a part of the battery case that contacts the electrode lead.

In a specific example, an insulating film may be taped on the part of the battery case that contacts the electrode lead, and the position of the lead-fixing jig on the plate may be spaced apart by a predetermined distance from the insulating film.

Further, the jig for charging and discharging a battery cell according to the present invention may further include a pressing plate to press the battery cell.

Further, the jig for charging and discharging a battery cell according to the present invention may further include a charge and discharge unit configured to charge and discharge the battery cell.

Advantageous Effects

According to the present invention, it is possible to allow an electrode lead to be fastened at a desired position without performing a separate position adjusting process by forming a recessed portion at a part where a jig contacts an electrode lead, in a lead-fixing jig which fixes an electrode lead. Further, it is possible to prevent an insulating film from being fastened to a jig by fastening an electrode lead at a desired position.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

A jig for charging and discharging a battery cell according to the present invention includes: a plate where a target battery cell is disposed; and a lead-fixing jig which is located in at least one side of the plate and fixes an electrode lead drawn from a battery case by pressing the electrode lead from both sides, wherein a recessed portion is formed at an area where the lead-fixing jig contacts the electrode lead.

As described above, if the battery cell is not fixed at the accurate position during the process where the electrode lead is fastened to the jig, even the insulating film attached on the electrode lead may be fastened to the jig, which may cause interference during charge/discharge.

In order to prevent such a problem, an electrode lead should be fastened accurately at a desired position of a jig. However, there was a problem that in the case that it was difficult to check the inside of the jig depending on the environment around the jig, it was difficult to accurately fasten the electrode lead at a desired position.

According to the present invention, it is possible to allow an electrode lead to be fastened at a desired position without performing a separate position adjusting process by forming a recessed portion at a part where a jig contacts an electrode lead, in a lead-fixing jig which fixes an electrode lead. Further, it is possible to prevent an insulating film from being fastened to a jig by fastening an electrode lead at a desired position.

First, in a jig for charging and discharging a battery cell according to the present invention, the plate provides a space where a battery cell can be disposed.

Further, the battery cell may have a structure where an electrode assembly, which is obtained by alternate lamination of a positive electrode, a separator and a negative electrode, is accommodated in a battery cell. The positive electrode and the negative electrode each have a structure where an electrode slurry containing an electrode active material is applied on a current collector, which was then dried and rolled to thereby form an active material layer. When an electrode assembly is accommodated in a battery case, an electrolyte solution may be injected into the inside and be sealed to thereby manufacture a battery cell.

Herein, the current collector may be a positive electrode current collector or a negative electrode current collector, and the electrode active material may be a positive electrode active material or a negative electrode active material. In addition, the electrode slurry may further include a conductive material and a binder in addition to the electrode active material.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d \leq 1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; carbon fluoride; metal powders such as aluminum and nickel powder; conductive whiskers such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene terpolymer (EPDM), sulfonated EPDM, styrene-butadiene rubber, fluorine rubber, various copolymers and the like.

Further, the separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like.

Further, in an electrode assembly, an electrode tab is formed at one side of an electrode, and the electrode tab may be a positive electrode tab or a negative electrode tab. A positive electrode lead and a negative electrode lead are connected to the positive electrode tab and the negative electrode tab, respectively. The positive electrode lead and the negative electrode lead are drawn to the outside to thereby play a role of a terminal which is electrically connected to the outside. At this time, the positive electrode lead and the negative electrode lead may be joined to the positive electrode tab and the negative electrode tab, respectively, by welding. Known welding methods may be used. For example, an ultrasonic welding or a laser welding may be used.

At this time, the battery case is not particularly limited as long as it is used as an exterior material for packaging the battery, and a cylindrical, square, or pouch type may be used and specifically a pouch-type battery case may be used. The pouch-type battery case is generally made of an aluminum laminate sheet and may be composed of an inner sealant layer for sealing, a metal layer for preventing permeation of materials, and an external resin layer forming the outermost part of the case. A battery cell is manufactured by heat-fusing an upper case and a lower case in a state that an electrode lead has been drawn after an electrode assembly was accommodated in a pouch-type battery case. In this case, a heat fusion sealing unit may be formed at the end of the battery case. Details of the battery case are known to those of ordinary skill in the art, and thus detailed description thereof will be omitted.

Further, a lead-fixing jig is positioned in at least one side of the plate. The lead-fixing jig fixes the electrode lead by pressing the electrode lead, which is drawn from the battery case, from both surfaces. When the electrode lead has a shape drawn from both sides of the battery case in opposite directions, the lead-fixing jig is positioned at both sides of the plate. Further, it is possible for two electrode leads to be drawn in the same direction, and in this case, two lead-fixing jigs are positioned at one side of the plate.

The lead-fixing jig includes: a lower jig which supports the electrode lead from a lower portion of the electrode lead; and an upper jig which presses the electrode lead from an upper portion of the electrode lead. That is, the electrode lead may be located on the interface between the upper jig and the lower jig. At this time, in order to prevent the electrode lead from being bent, the height of the plate can be adjusted so that the electrode lead can be disposed on the upper surface of the lower jig.

Further, the lead-fixing jig may have a moving means for moving an upper jig in order to press the electrode lead. The moving means may use, for example, a screw. The screw refers to a member having a thread on the side surface. Since the screw has been inserted into a support having a through hole, the screw can be vertically moved through rotary motion. Hence, the downward movement of the screw may allow the upper jig to press the electrode lead. Further, the upper jig may be configured to slide along the support in order to allow the upper jig to be vertically moved stably. However, the moving scheme of the upper jig is not limited thereto, and there is no particular limitation to the moving scheme as long as the upper jig can press the electrode lead while vertically moving.

Further, a recessed portion is formed at an area where the lead-fixing jig contacts the electrode lead to allow the electrode lead to be disposed. The recessed portion acts as an indicator which indicates an appropriate position of the electrode lead when the electrode lead is fastened to the lead-fixing jig. In this case, if the electrode lead is disposed on the recessed portion, the electrode lead is automatically positioned at a correct position. Namely, the electrode lead can be fastened at a correct position even if it is not checked whether the electrode lead is positioned at the correct position through the recessed portion using naked eyes.

In one example, the recessed portion may be formed on an upper surface of the lower jig. As the recessed portion is formed in the lower jig, the electrode lead may be fastened at a correct position of the lead-fixing jig before the battery cell is fastened to the electrode lead after being disposed on the plate. When the electrode lead is disposed on the recessed portion formed at the lower jig, it means that the battery cell has been positioned at a correct position of the plate. Thereafter, the battery cell can be fixed by pressing the electrode lead by lowering the upper jig. In this case, the lower surface part where the upper jig faces the electrode lead may have a flat shape.

In this case, a depth of the recessed portion may correspond to a thickness of the electrode lead or may be smaller than a thickness of the electrode lead. This is to allow the electrode lead to be pressed and fixed at a space between the upper jig and the lower jig. If the depth of the recessed portion is greater than the thickness of the electrode lead, the electrode lead cannot be pressed by the upper jig, and accordingly, it becomes difficult for the electrode lead to be fixed.

In another example, the recessed portion may be formed on both of a lower surface of the upper jig and an upper surface of the lower jig. In this case, the electrode lead is positioned at a space surrounded by a recessed portion formed at the upper jig and a recessed portion formed at the lower jig. Likewise, when the battery cell is disposed on the plate, the battery cell is positioned at a correct position of the plate as the electrode lead is disposed on the recessed portion formed at the lower jig. Thereafter, the electrode lead is pressed by lowering the upper jig. At this time, since the recessed portion has been formed in the upper jig, too, it is possible to prevent the electrode lead from being positioned outside the recessed portion.

In this case, a sum of thicknesses of recessed portions of the lower jig and the upper jig corresponds to a thickness of the electrode lead or is smaller than thickness of the electrode lead. This is to allow the electrode lead to be pressed and fixed at a space between the upper jig and the lower jig. If the sum of the thicknesses of recessed portions formed at the lower jig and the upper jig is greater than the thickness of the electrode lead, the thickness of the space formed between the upper jig and the lower jig becomes greater than thickness of the electrode lead. In this case, it becomes difficult for the electrode lead to be fixed because the electrode lead is not pressed by the upper jig.

Further, there is no particular limitation to the shape of the horizontal section of the recessed portion as long as the electrode lead can be completely disposed on the recessed portion. For example, the horizontal section of the recessed portion may have a quadrangle shape. Generally, since the drawn part of the electrode lead has a quadrangle shape, it is possible for the electrode lead to be easily positioned at a correct position as the recessed portion also has a shape corresponding to the shape of the electrode lead. Herein, the shape of the horizontal section means a cross-sectional shape in a direction parallel to the ground or a cross-sectional shape in a direction in which the electrode lead is drawn.

At this time, a length in a width direction of the recessed portion may be greater than a length in a width direction of the electrode lead. Herein, width direction means a direction perpendicular to the direction in which the electrode lead is drawn on the horizontal plane.

In the case that the length in the width direction of the recessed portion is the same as the length in the width direction of the electrode lead, it is possible to prevent the movement of the battery cell due to an extra space between the electrode lead and the recessed portion, but it may take a long time in finding out the accurate position of the recessed portion in order to allow the electrode lead to be disposed at the recessed portion. Hence, the electrode lead can be disposed at a recessed portion without checking the position of the recessed portion, and time that takes in fastening the electrode lead can be reduced, by setting the length in the width direction of the recessed portion to be greater than the length in the width direction of the electrode lead.

For example, the length in the width direction of the recessed portion may correspond to 1.1 to 1.5 times, specifically 1.2 to 1.4 times of the length in the width direction of the electrode lead. When the length in the width direction of the recessed portion is less than the above range, it may take a long time in allowing the electrode lead to be disposed at the recessed portion. On the contrary, when the length in the width direction of the recessed portion exceeds the above range, the electrode lead is easily moved in the width direction. As such, it may be difficult for the battery cell to be fixed at the accurate position.

Further, the lead-fixing jig may be positioned to allow an end of the electrode lead to contact an inner wall of the recessed portion. Namely, it is desirable to minimize the space between the end of the electrode lead and the inner wall of the recessed portion. Herein, the end of the electrode lead is set based on the direction in which the electrode lead is drawn. When the lead-fixing jig is too close to the battery cell, it is difficult for the electrode lead to be disposed at the recessed portion, and during this process, the electrode lead may be bent or other problems may occur. When a space is formed between the end of the electrode lead and the inner wall of the recessed portion as the lead-fixing jig is positioned too far away from the battery cell, the battery cell may be moved in the direction in which the electrode lead is drawn. As such, the battery cell may not be disposed at the correct position. In this case, as will be described later, a problem that the end of the battery case or the portion where an insulating film is formed is fastened in the lead-fixing jig may occur.

Namely, the length in the width direction of the recessed portion may be sufficiently set to easily fasten the electrode lead, and it is possible to allow the battery cell to be positioned at a correct position by allowing the end of the electrode lead to contact the inner wall of the recessed portion.

Further, the lead-fixing jig may be positioned at a position spaced apart by a predetermined distance from a part where the battery case contacts the electrode lead. As described above, this is to prevent the battery case from being pressed by the lead-fixing jig.

Further, an insulating film may be taped on the part where the battery case contacts the electrode lead. Specifically, as the insulating film is taped on a portion where the electrode lead contacts the battery case, the insulating film prevents a short circuit phenomenon which may occur as the electrode lead and the aluminum metal layer in the pouch constituting the battery case contact each other. At this time, the lead-fixing jig may be positioned at a position spaced apart by a predetermined distance from the insulating film. Likewise, it is to prevent the insulating film from causing interference as the insulating film and the electrode lead are pressed together by the lead-fixing jig.

In another example, the jig for charging and discharging a battery cell according to the present invention may further include a pressing plate which presses the battery cell. It is possible to effectively fix the battery cell by further including a pressing plate which presses the battery case of the battery cell separately from the lead-fixing jig.

Further, the jig for charging and discharging a battery cell according to the present invention may further include a charge and discharge unit which charges and discharges the battery cell. It is possible to activate the battery cell or evaluate the performance of the battery cell by using the charge and discharge unit.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

Figure 2:
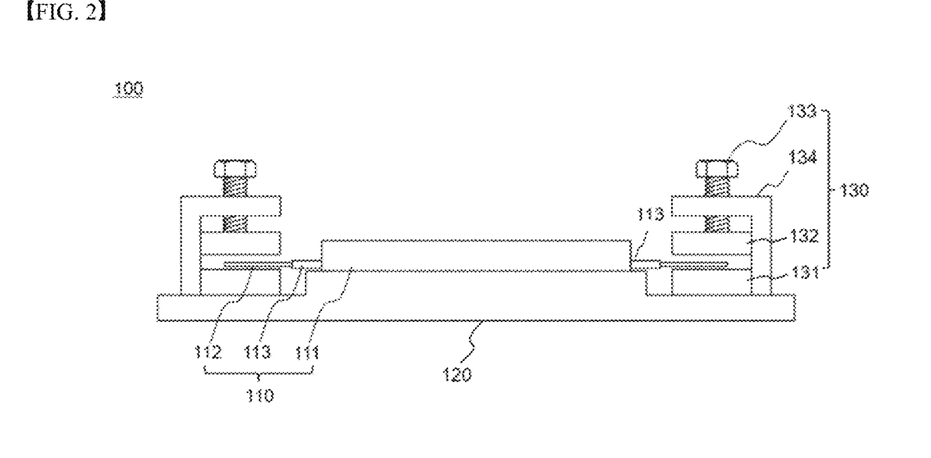
FIG. 2 is a schematic diagram showing a structure of a jig for charging and discharging a battery cell according to the present invention.
Figure 3:
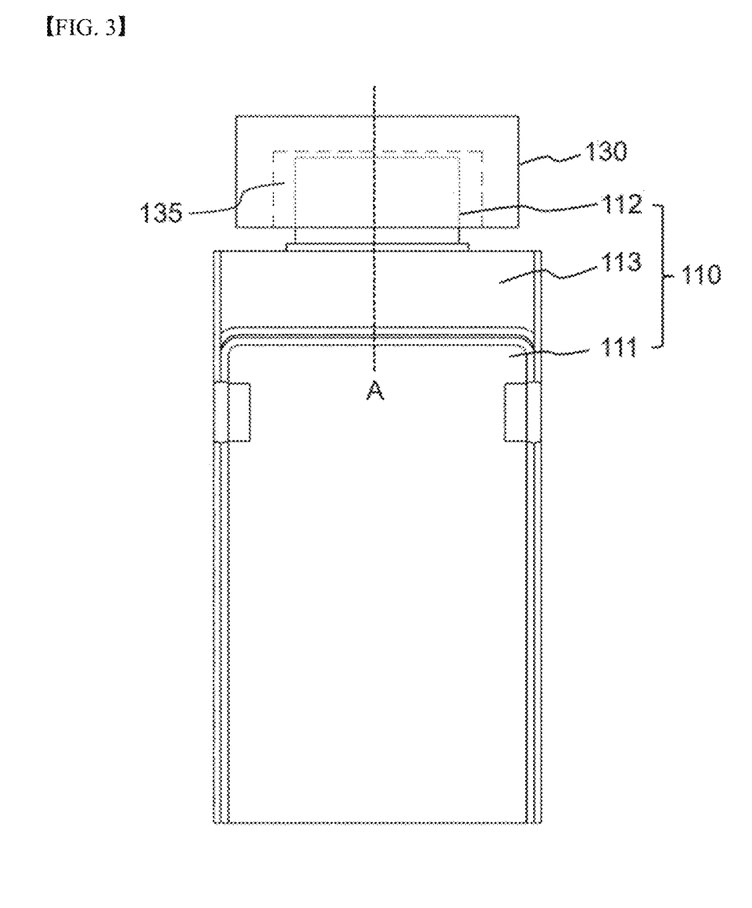
FIG. 3 is a top view showing a state in which a battery cell has been fastened to a lead-fixing jig, in a jig for charging and discharging a battery cell.

FIG. 2 is a schematic diagram showing a structure of a jig for charging and discharging a battery cell according to the present invention, and FIG. 3 is a top view showing a state in which a battery cell has been fastened to a lead-fixing jig, in a jig for charging and discharging a battery cell.

Referring to FIGS. 2 and 3, a jig 100 for charging and discharging a battery cell 110 according to the present invention includes: a plate 120 where a target battery cell 110 is disposed; and a lead-fixing jig 130 which is located in at least one side of the plate 120 and fixes an electrode lead 112 drawn from a battery case 111 by pressing the electrode lead 112 from both sides.

At this time, referring to FIGS. 2 and 3, the battery cell 110 is a pouch-type battery cell and has a structure where an electrode lead 112 is drawn from both sides of a pouch-type battery case 111. As such, in FIGS. 2 and 3, it is illustrated that a lead-fixing jig 130 is positioned at each of two sides of the plate 120, but it is possible for two electrode leads to be drawn in the same direction, and in this case, two lead-fixing jigs may be positioned at one side of the plate. Further, a heat fusion sealing unit 113 may be formed at the end of the battery case 111.

Further, the lead-fixing jig 130 includes: a lower jig 131 which supports the electrode lead 112 from a lower portion of the electrode lead 112; and an upper jig 132 which presses the electrode lead 112 from an upper portion of the electrode lead 112.

Further, the lead-fixing jig 130 includes a moving means for moving the upper jig 132 to press the electrode lead 112, and the moving means may include a screw 133 for transmitting pressing force to the upper jig 132 and a support 134 for supporting the screw 133. The screw 133 is moved in a vertical direction through rotary motion in a state that the screw has penetrated the support 134.

Figure 4:
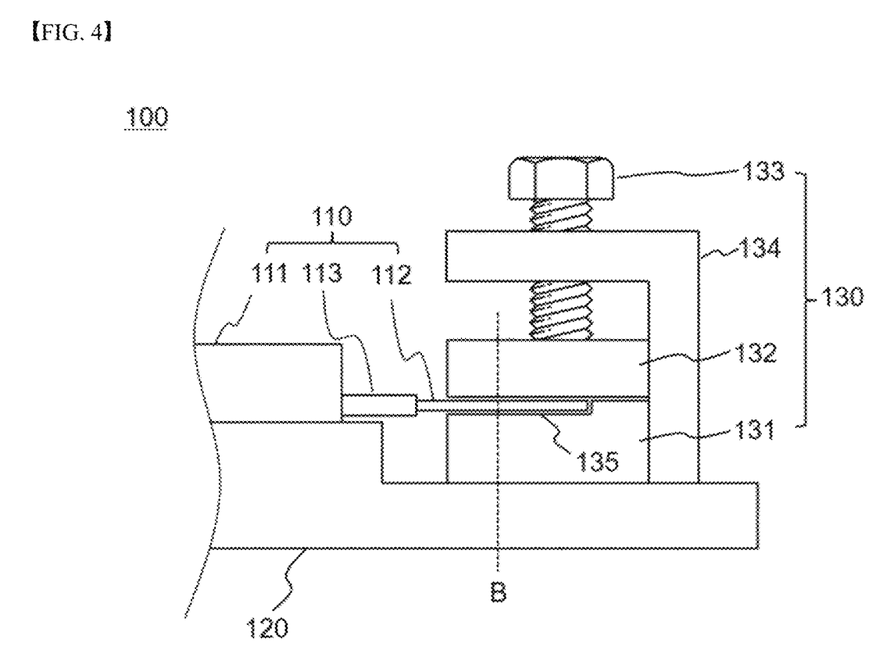
FIGS. 4 and 5 are schematic diagrams illustrating a state where a battery cell has been fastened to a lead-fixing jig in a jig for charging and discharging a battery cell according to one embodiment of the present invention.
Figure 5:
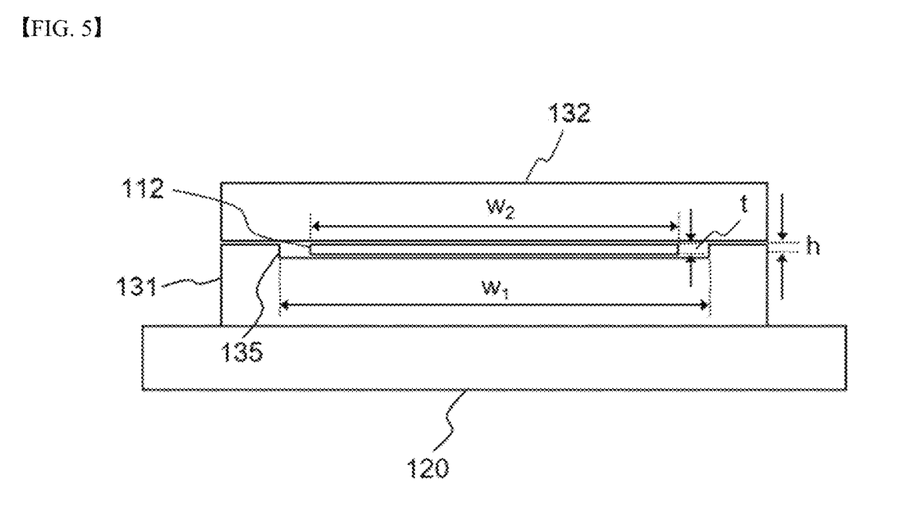

FIGS. 4 and 5 are schematic diagrams illustrating a state where a battery cell has been fastened to a lead-fixing jig in a jig for charging and discharging a battery cell according to one embodiment of the present invention. FIG. 4 shows a cross-section of part A of FIG. 3, and FIG. 5 shows a cross-section of part B of FIG. 4.

Referring to FIGS. 4 and 5 together with FIG. 3, a recessed portion 135, which is recessed to allow the electrode lead 112 to be disposed, is formed at a portion where the lead-fixing jig 130 contacts the electrode lead 112, in the lead-fixing jig 130. Referring to FIG. 3, the horizontal section of the recessed portion 135 has a quadrangle shape corresponding to the shape of the electrode lead 112. Likewise, it is possible to allow the electrode lead 112 to be fastened at a correct position without checking whether the electrode lead 112 is positioned at a correct position with naked eyes through the recessed portion 135. At this time, the recessed portion 135 may be formed on the upper surface of the lower jig 131, and the depth (h) of the recessed portion 135 may correspond to or be smaller than the thickness (t) of the electrode lead 112 in order to fix the electrode lead 112.

Referring to FIGS. 3 to 5, the length ($w_1$) in the width direction of the recessed portion is greater than the length ($w_2$) in the width direction of the electrode lead 112. Further, the lead-fixing jig 130 is positioned so that the end of the electrode lead 112 contacts the inner wall of the recessed portion 135. Through this, it is possible to fasten the electrode lead 112 at an accurate position while easily fastening the electrode lead 112 at the lead-fixing jig 130.

Further, as the lead-fixing jig 130 is positioned at a position spaced apart from a contact portion between the battery case 111 and the electrode lead 112, specifically the heat fusion sealing unit 113, by a predetermined distance, it is possible to prevent the end of the battery case 111 from being pressed by the lead-fixing jig 130.

Second Embodiment

Figure 6:
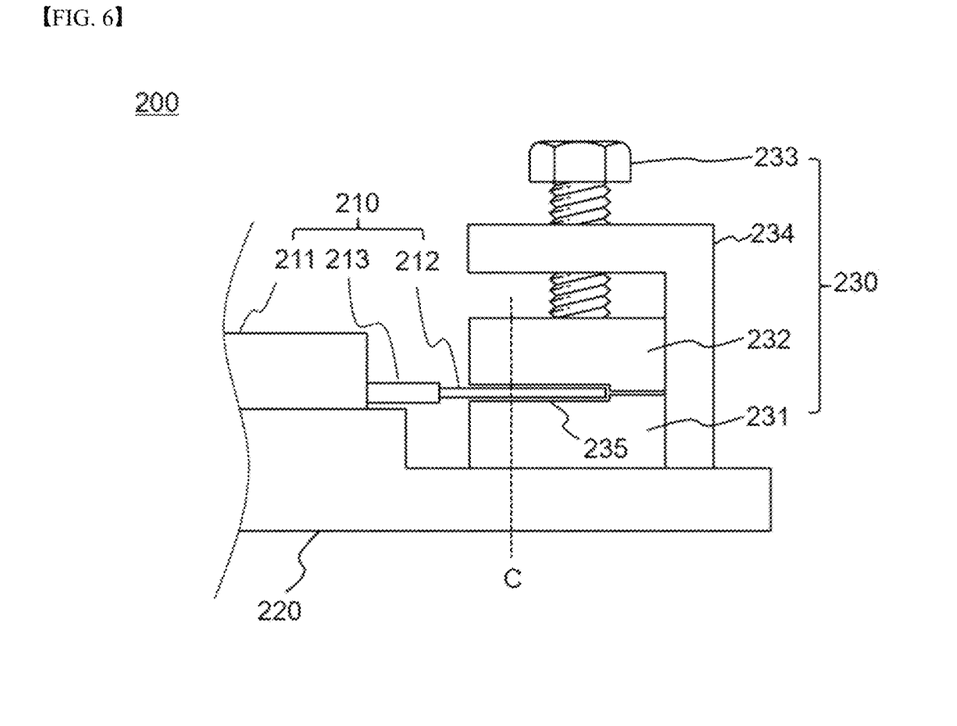
FIGS. 6 and 7 are schematic diagrams illustrating a state where a battery cell has been fastened to a lead-fixing jig in a jig for charging and discharging a battery cell according to another embodiment of the present invention.
Figure 7:
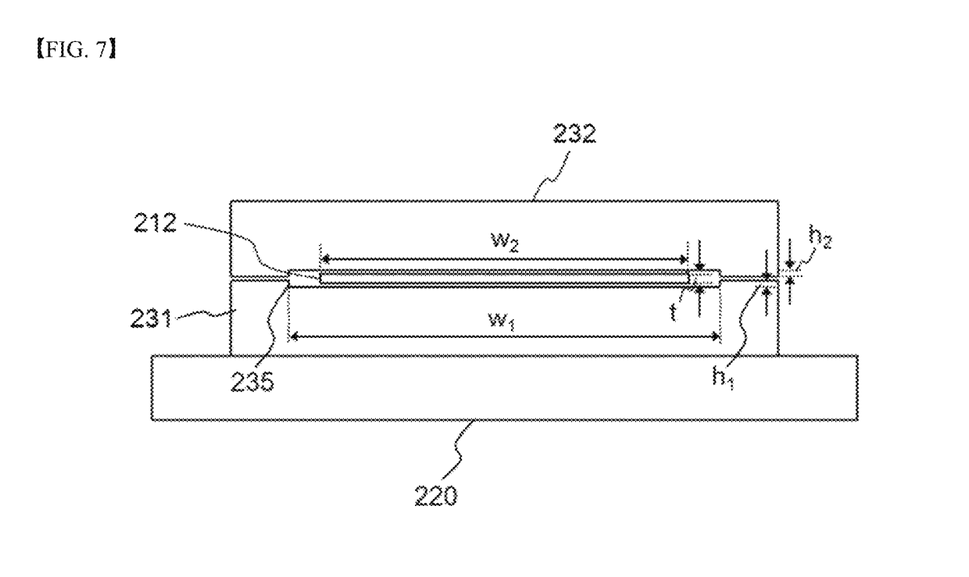

FIGS. 6 and 7 are schematic diagrams illustrating a state where a battery cell has been fastened to a lead-fixing jig in a jig for charging and discharging a battery cell according to another embodiment of the present invention. FIG. 7 shows a cross-section of part C of FIG. 6.

Referring to FIGS. 6 and 7, a jig for charging and discharging a battery cell 200 includes: a plate 220 where a target battery cell 210 is disposed; and a lead-fixing jig 230 which is located in at least one side of the plate 220 and fixes an electrode lead 212 drawn from a battery case 211 by pressing the electrode lead 212 from both sides. The battery cell 210 is a pouch-type battery cell and has a structure where the electrode lead 212 is drawn at two sides of the pouch-type battery case 211. Further, a heat fusion sealing unit 213 is formed at the end of the battery case 211.

Further, the lead-fixing jig 230 includes: a lower jig 231 which supports the electrode lead 212 from a lower portion of the electrode lead 212; and an upper jig 232 which presses the electrode lead 212 from an upper portion of the electrode lead 212. Further, the lead-fixing jig 230 includes a moving means for moving the upper jig 232 to press the electrode lead 212, and the moving means may include a screw 233 for transmitting pressing force to the upper jig 232 and a support 234 for supporting the screw 233.

Referring to FIGS. 6 and 7, a recessed portion 235, which is recessed to allow the electrode lead 212 to be disposed, is formed at a portion where the lead-fixing jig 230 contacts the electrode lead 212, in the lead-fixing jig 230. At this time, the recessed portion 235 is formed on both the lower surface of the upper jig 232 and the upper surface of the lower jig 231. At this time, the sum $(h_1+h_2)$ of thicknesses of the recessed portions 235 formed on the lower jig 231 and the upper jig 232 to fix the electrode lead 212 may correspond to or smaller than the thickness (t) of the electrode lead 212.

Further, a length $(w_1)$ in a width direction of the recessed portion 235 is greater than a length $(w_2)$ in a width direction of the electrode lead 212. Further, the lead-fixing jig 230 is positioned so that the end of the electrode lead 212 contacts the inner wall of the recessed portion 235. Through this, it is possible to fasten the electrode lead 212 at an accurate position while easily fastening the electrode lead 112 at the lead-fixing jig 230.

Further, as the lead-fixing jig 230 is positioned at a position spaced apart from a contact portion between the battery case 211 and the electrode lead 212, specifically the heat fusion sealing unit 213, by a predetermined distance, it is possible to prevent the end of the battery case 211 from being pressed by the lead-fixing jig 230.

Third Embodiment

Figure 8:
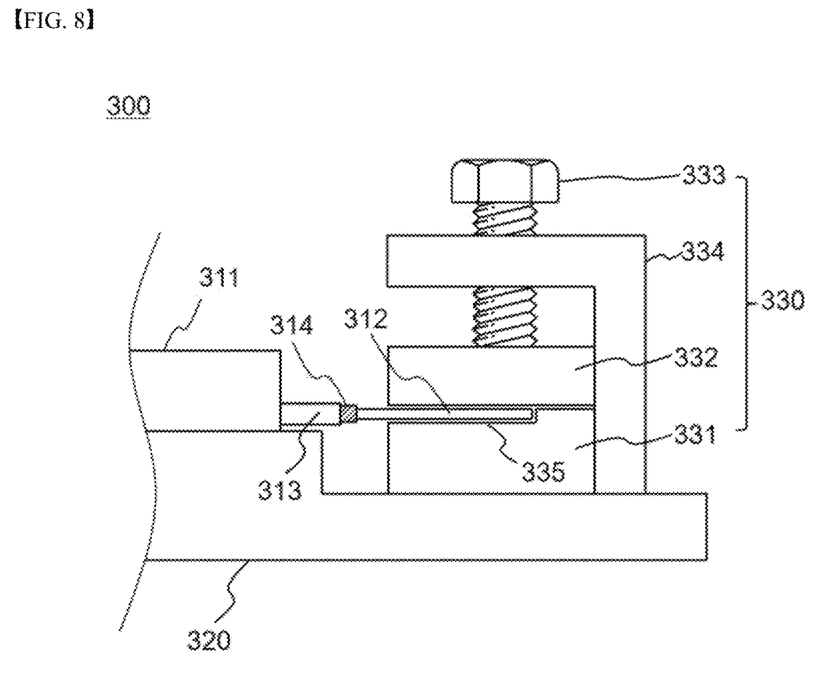
FIG. 8 is a schematic diagram showing a state in which a battery cell has been fastened to a lead-fixing jig in a jig for charging and discharging a battery cell in the case that an insulating film has been formed at an electrode lead.

FIG. 8 is a schematic diagram showing a state in which a battery cell has been fastened to a lead-fixing jig in a jig for charging and discharging a battery cell in the case that an insulating film has been formed at an electrode lead.

Referring to FIG. 8, a jig for charging and discharging a battery cell 300 includes: a plate 320 where a target battery cell 310 is disposed; and a lead-fixing jig 330 which is located in at least one side of the plate 320 and fixes an electrode lead 312 drawn from a battery case 311 by pressing the electrode lead 312 from both sides. The battery cell 310 is a pouch-type battery cell and has a structure where the electrode lead 312 is drawn at two sides of the pouch-type battery case 311. Further, a heat fusion sealing unit 313 is formed at the end of the battery case 311. Further, an insulating film 314 is taped on a contact portion between the battery case 311 and the electrode lead 312, specifically a contact portion between the heat fusion sealing unit 313 and the electrode lead 312.

Further, the lead-fixing jig 330 includes: a lower jig 331 which supports the electrode lead 312 from a lower portion of the electrode lead 312; and an upper jig 332 which presses the electrode lead 312 from an upper portion of the electrode lead 312. Further, the lead-fixing jig 330 includes a moving means for moving the upper jig 332 to press the electrode lead 312, and the moving means may include a screw 333 for transmitting pressing force to the upper jig 332 and a support 334 for supporting the screw 333. A recessed portion 335, which is recessed to allow the electrode lead 312 to be disposed, is formed at a portion where the lead-fixing jig 330 contacts the electrode lead 312.

At this time, as the lead-fixing jig 330 is positioned at a place spaced apart from the insulating film 314 by a predetermined distance, it is possible to prevent the insulating film 314 from being pressed together when the electrode lead 312 is fastened.

Fourth Embodiment

Figure 9:
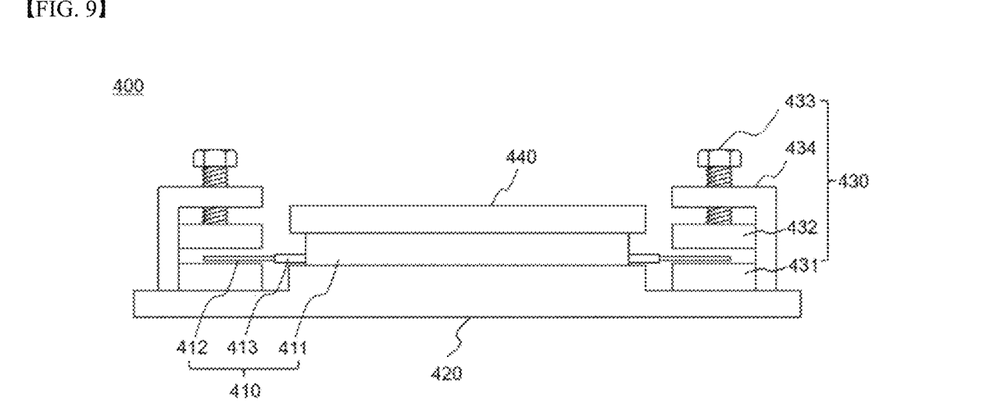
FIG. 9 is a schematic diagram showing a structure of a jig for charging and discharging a battery cell according to another embodiment of the present invention.

FIG. 9 is a schematic diagram showing a structure of a jig for charging and discharging a battery cell according to another embodiment of the present invention.

Referring to FIG. 9, a jig for charging and discharging a battery cell 400 includes: a plate 420 where a target battery cell 410 is disposed; and a lead-fixing jig 430 which is located in at least one side of the plate 420 and fixes an electrode lead 412 drawn from a battery case 411 by pressing the electrode lead 412 from both sides. The battery cell 410 is a pouch-type battery cell and has a structure where the electrode lead 412 is drawn at two sides of the pouch-type battery case 411. Further, a heat fusion sealing unit 413 is formed at the end of the battery case 411.

Further, the lead-fixing jig 430 includes: a lower jig 431 which supports the electrode lead 412 from a lower portion of the electrode lead 412; and an upper jig 432 which presses the electrode lead 412 from an upper portion of the electrode lead 412. Further, the lead-fixing jig 430 includes a moving means for moving the upper jig 432 to press the electrode lead 412, and the moving means may include a screw 433 for transmitting pressing force to the upper jig 432 and a support 434 for supporting the screw 433.

Further, the jig 400 for charging and discharging a battery cell further includes a pressing plate 440 for pressing the battery cell 410. The pressing plate 440 is positioned at the upper portion of the battery cell 410 and presses the battery cell 410. Through this, it is possible to effectively fix the battery cell 410 on the plate 420.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS 100, 200, 300, 400: jig for charging and discharging a battery cell 110, 210, 310, 410: battery cell
111, 211, 311, 411: battery case
112, 212, 312, 412: electrode lead
113, 213, 313, 413: heat fusion sealing unit
120, 220, 320, 420: plate
130, 230, 330, 430: lead-fixing jig
131, 231, 331, 431: lower jig
132, 232, 332, 432: upper jig
133, 233, 333, 433: screw
134, 234, 334, 434: support
135, 235, 335: recessed portion
314: insulating film
440: pressing plate

The invention claimed is:

1. A jig for charging and discharging a battery cell, the jig comprising:
 a plate configured to support a battery cell; and
 a lead-fixing jig located at at least one side of the plate, the lead-fixing jig configured to contact and fix an electrode lead drawn from a battery case of the battery cell by pressing the electrode lead from upper and lower sides of the electrode lead, the lead-fixing jig including:
  a lower jig to support the electrode lead from the lower side of the electrode lead; and
  an upper jig to press the electrode lead from the upper side of the electrode lead,
 wherein at least one recessed portion is formed at an area where the lead-fixing jig contacts the electrode lead, the at least one recessed portion including:
  a first recessed portion on a lower surface of the upper jig at an area that contacts the electrode lead; and
  a second recessed portion on an upper surface of the lower jig at an area that contacts the electrode lead.

2. The jig of claim 1, wherein a sum of thicknesses of the first and second recessed portions is equal to a thickness of the electrode lead or is smaller than the thickness of the electrode lead.

3. The jig of claim 1, wherein a shape of a horizontal section of the at least one recessed portion corresponds to a shape of the electrode lead.

4. The jig of claim 3, wherein the horizontal section of the at least one recessed portion has a quadrangle shape.

5. The jig of claim 1, wherein a width of the at least one recessed portion is greater than a width of the electrode lead.

6. The jig of claim 1, wherein the at least one recessed portion includes an inner wall perpendicular to the plate, and
 wherein the lead-fixing jig is positioned on the plate to cause an end of the electrode lead to contact the inner wall of the at least one recessed portion.

7. The jig of claim 1, wherein the lead-fixing jig is positioned on the plate at a position spaced apart by a predetermined distance from a part of the battery case that contacts the electrode lead.

8. The jig of claim 7, wherein an insulating film is taped on the part of the battery case that contacts the electrode lead, and
 wherein the position of the lead-fixing jig on the plate is spaced apart by a predetermined distance from the insulating film.

9. The jig of claim 1, further comprising a pressing plate configured to press the battery cell.

10. The jig of claim 1, further comprising a charge and discharge unit configured to charge and discharge the battery cell.

* * * * *